United States Patent [19]
Buckley

[11] Patent Number: 5,370,360
[45] Date of Patent: Dec. 6, 1994

[54] BELLMOUTH DUCT FITTING

[76] Inventor: Robert Buckley, 30 Chisolm Rd., South Weymouth, Mass. 02190

[21] Appl. No.: 96,455
[22] Filed: Jul. 26, 1993
[51] Int. Cl.⁵ ............................................... F16K 1/22
[52] U.S. Cl. ..................................... 251/305; 251/145
[58] Field of Search .................. 251/305, 145; 285/189

[56] References Cited

U.S. PATENT DOCUMENTS

| | | | |
|---|---|---|---|
| 1,823,028 | 9/1931 | Caldwell | 285/189 |
| 2,101,311 | 12/1937 | Duncan | 285/189 X |
| 3,771,759 | 11/1973 | Pauquette | 251/305 X |
| 3,880,189 | 4/1975 | Bennett | 251/305 X |
| 4,715,581 | 12/1987 | Myers | 251/305 X |

*Primary Examiner*—John C. Fox

[57] ABSTRACT

This is a unitary bellmouth duct fitting having a tubular body portion and a bellmouth portion; the tubular body portion has a circumferential terminal edge from which the bellmouth portion or flange radially and integrally extends and the bellmouth portion merges with the tubular body portion to provide a less than two inch radius; the bellmouth portion has a lower surface which has a double sided adhesive first gasket engaged therewith and has a series of spaced holes formed therethrough, the first gasket is of a somewhat malleable material, and is of a ring-shaped configuration, the tubular body portion has an inner surface, the first gasket is of a malleable material and of a ring-shaped configuration, a first, through aperture is formed in the body portion spaced from the bellmouth portion, a second through aperture is formed in the body portion on the same horizontal plane as the first aperture, a damper fitted within the bellmouth duct fitting, the damper of a disk like configuration, has an upper surface, a peripheral edge and an outside diameter a solid threaded bearing is attached to the upper surface of the damper at opposite sides of the peripheral edge, each of the solid threaded bearings includes a threaded element, the threaded elements of the solid threaded bearings extend beyond the peripheral edge of the damper, one of the threaded elements passed through the first aperture and the other threaded element passed through the second aperture, a gasketed washer engaged around the threaded element bearing against the inner surface adjacent the second aperture.

1 Claim, 4 Drawing Sheets

BELLMOUTH DUCT FITTING

BACKGROUND OF THE INVENTION

This invention relates to a unitary bellmouth duct fitting used in heating ducts, for example.

SUMMARY OF THE INVENTION

The invention comprising a unitary bellmouth duct fitting having a tubular body portion, having a height of six (6") inches and a bellmouth portion. The tubular body portion has a circumferential terminal edge from which the bellmouth portion or flange radially and integrally extends and the bellmouth portion merges with the tubular body portion to provide a less than two inch radius. The bellmouth portion has a lower surface which has a double sided adhesive gasket engaged therewith and has a series of spaced holes formed therethrough. The first gasket is of a somewhat malleable material, rubber or plastic for example and is of a ring-shaped configuration. The threaded elements of the solid threaded bearings extend beyond the peripheral edge of the damper. One of the threaded elements is passed through the aperture and the other threaded element 32a is passed through the second aperture. A gasketed washer is engaged around the threaded element 32a before it is passed through the aperture.

BRIEF DESCRIPTION OF THE DRAWINGS

Further details are explained below with the help of the example(s) illustrated in the attached drawings in which.

DESCRIPTION OF THE PREFERRED EMBODIMENT(S)

Figure 1:
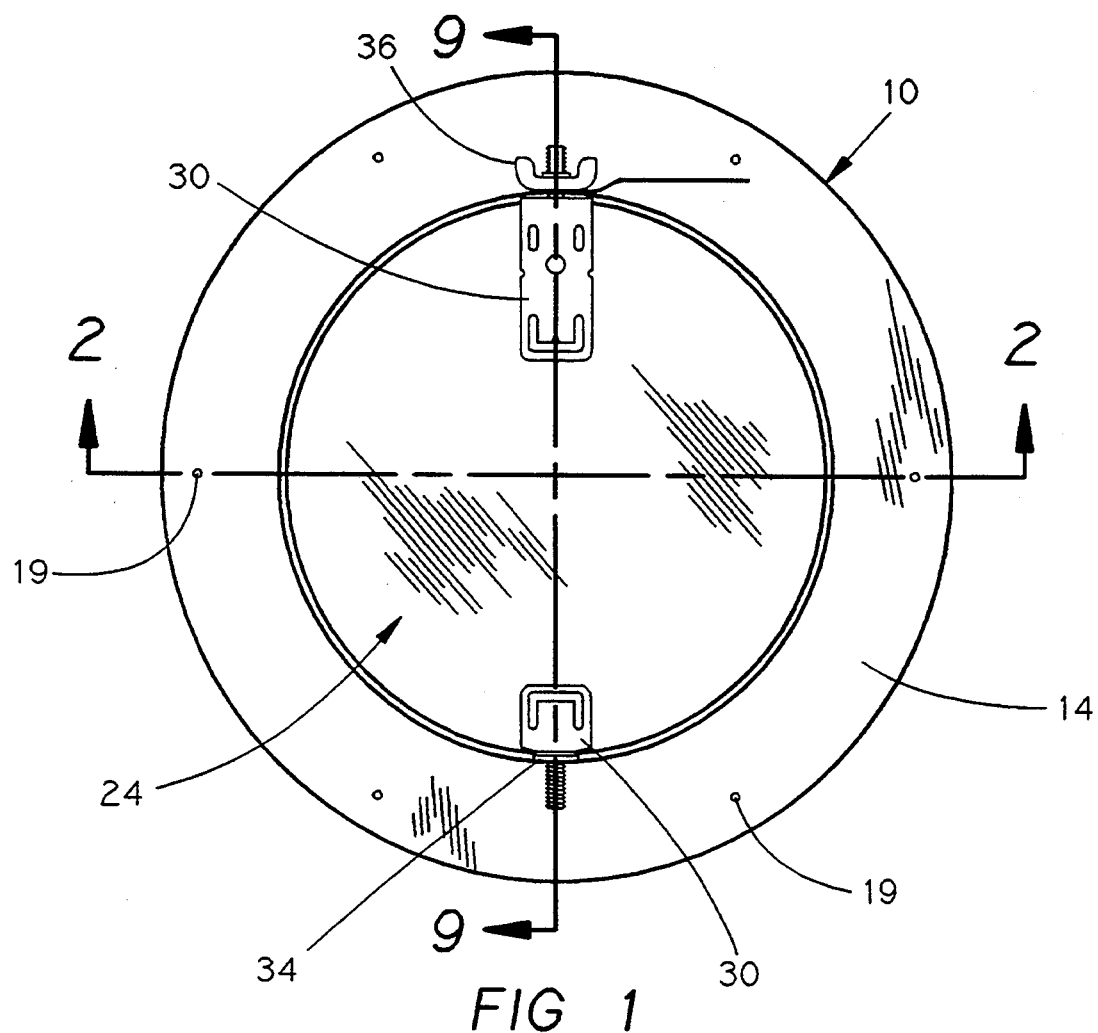
FIG. 1. is a top plan view of the unitary bellmouth duct fitting according to the present invention.
Figure 2:
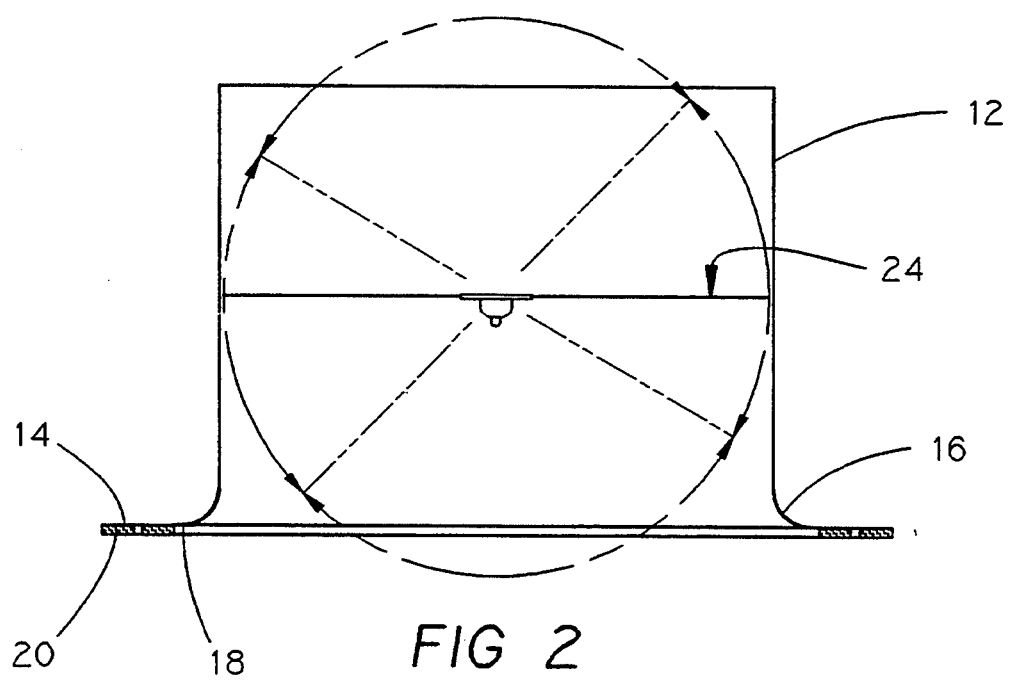
FIG. 2. is a sectional view of the unitary bellmouth duct fitting taken on line 2—2 of FIG. 1.
Figure 3:
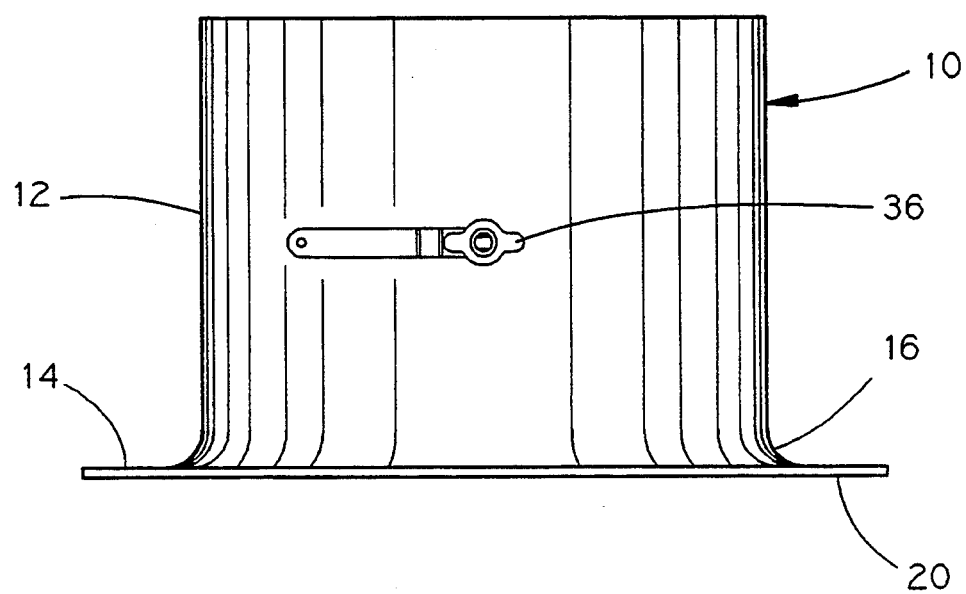
FIG. 3 is a side elevational view of the unitary bellmouth duct fitting shown in FIG. 1.
Figure 4:
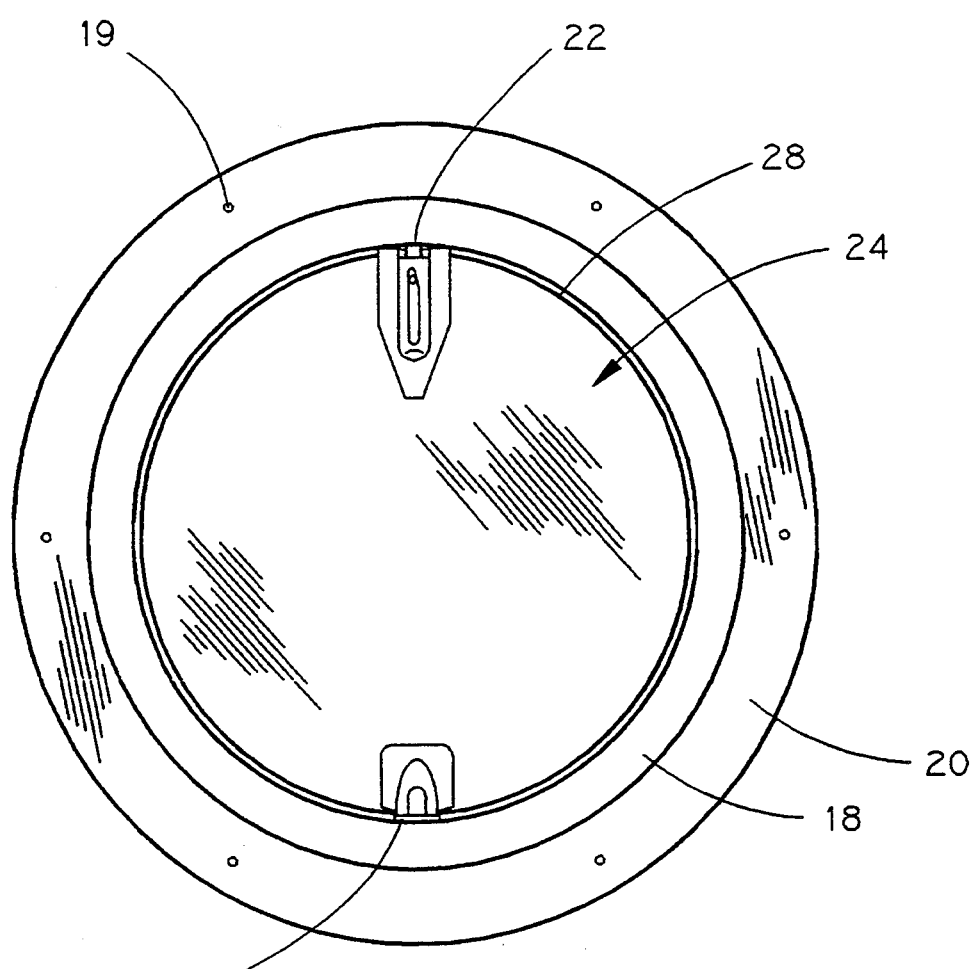
FIG. 4 is a bottom plan view of the unitary bellmouth duct fitting shown in FIG. 1.
Figure 6:
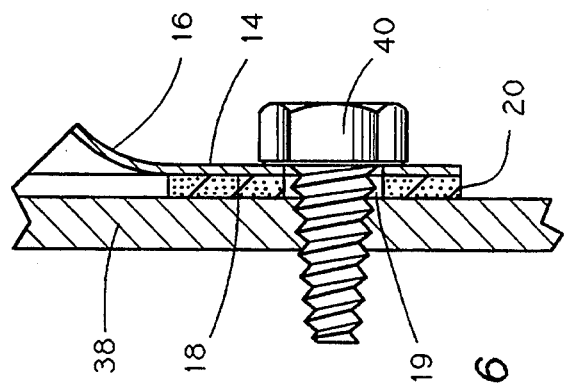
FIG. 6 is a sectional view showing the engagement of the Hex Tek screw to the unitary bellmouth duct fitting shown in FIG. 1.
Figure 5:
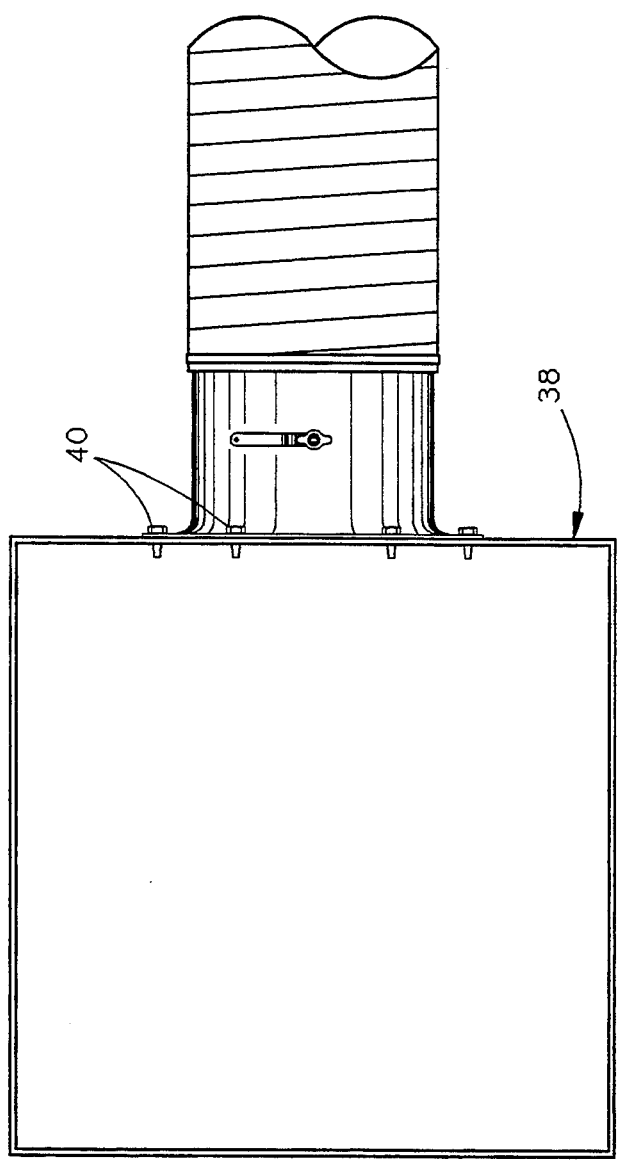
FIG. 5 is a side elevational view of the unitary bellmouth duct fitting shown in FIG. 1 attached to ducts.

There is shown in the drawings a unitary bellmouth duct fitting 10 comprising a tubular body portion 12 and a bellmouth portion 14. The tubular body portion 12 has a circumferential terminal edge 16 from which the bellmouth portion or flange 14 radially and integrally extends and the bellmouth portion 14 merges with the tubular body portion 12 to provide a less than two inch radius. The height of the body portion 12 may be six (6") inches. The bellmouth portion 14 has a lower surface 18 which has a double sided adhesive gasket 20 engaged therewith and has a series of spaced holes 19 formed therethrough. The first gasket 20 is of a somewhat malleable material, rubber or plastic for example and is of a ring-shaped configuration.

Figure 7:
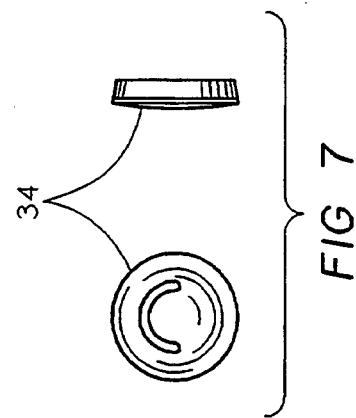
FIG. 7 is top and side elevational views of the gasketed washer used to engage around the threaded element before it is passed through the aperture.
Figure 8:
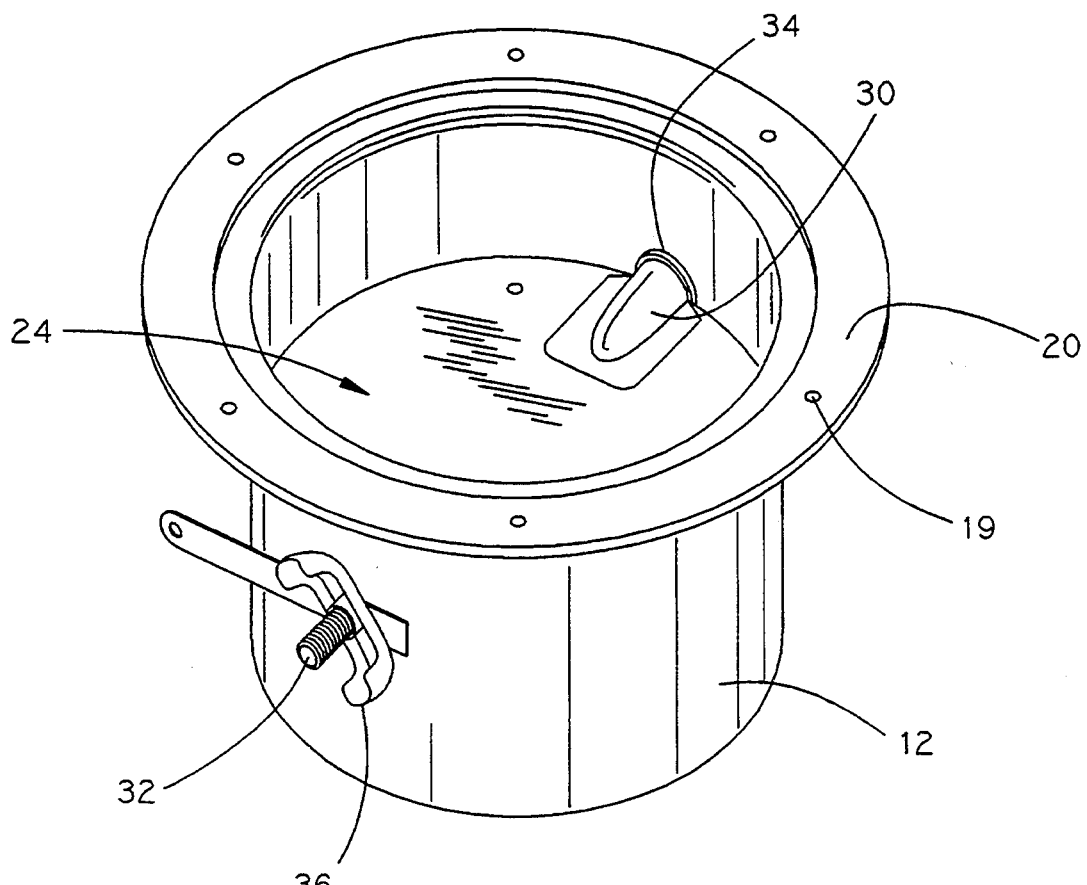
FIG. 8 is a bottom plan view of the unitary bellmouth duct fitting shown in FIG. 1, showing the double sided adhesive gasket engaged to the radius of the fitting.
Figure 9:
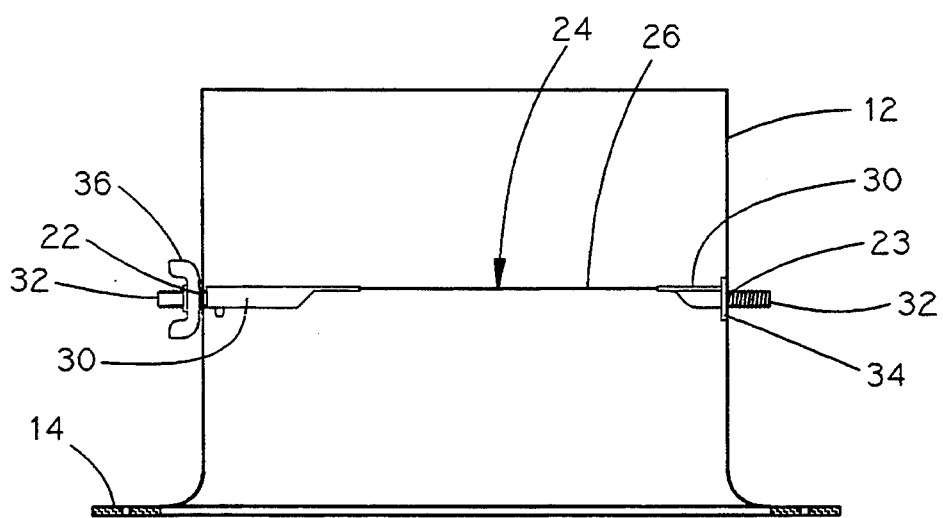
FIG. 9 is a sectional view of the assembly shown in FIG. 8.

A through aperture 22 is formed in the body portion 12 spaced from the bellmouth portion 14 as shown in FIG. 9. A second through aperture 23 is formed in the body portion 12 on the same horizontal plane as the aperture 22. A damper 24 may be utilized with the fitting 10. The damper 24 is of a disk like configuration, has an upper surface 26, a peripheral edge 28 and an outside diameter. The outside diameter of the damper 24 is equal to the inside diameter of the body portion 12. A solid threaded bearing 30 is attached to the upper surface 26 of the damper 24 at opposite sides of the peripheral edge 28 as shown in FIG. 9. The threaded elements 32, 32a of the solid threaded bearings 30 extend beyond the peripheral edge 28 of the damper 24. One of the threaded elements 32 is passed through the aperture 22 and the other threaded element 32a is passed through the second aperture 23. A gasketed washer 34 is engaged around the threaded element 32a before it is passed through the aperture 23. The gasketed washer 34 is thereby positioned between the body of the threaded bearing 30 and the inner wall of the body portion 12. The gasketed washer 34 is formed of a flexible material, such as rubber, foam or plastic, having a malleable metal bonded to one of its surfaces as shown in FIG. 7. A wing nut 36 completes the assembly.

The assembly of the fitting 10 and its damper sub assembly to a main duct 38 is accomplished by driving Hex Tek screws 40 through the holes 19, then through axially aligned holes in the first gasket 20 into holes formed through main duct 38. The first gasket 20 will adhere to the bellmouth portion 14 and to the external surface of the main duct 38. When the Hex Tek 40 are tightened, the first gasket 20 will compress and distort assuring a tight seal between the bellmouth portion 14 and to the external surface of the main duct 38.

What I claim is:

1. A unitary bellmouth duct fitting comprising a tubular body portion, a first gasket and a bellmouth portion, the tubular body portion having a terminal edge from which the bellmouth portion integrally extends and the bellmouth portion merging with the tubular body portion to provide a less than two inch radius, the tubular body portion has an inner surface, the first gasket is of a malleable material and of a ring-shaped configuration, a first, through aperture is formed in the body portion spaced from the bellmouth portion, a second through aperture is formed in the body portion on the same horizontal plane as the first aperture, a damper fitted within the bellmouth duct fitting, the damper of a disk like configuration, has an upper surface, a peripheral edge and an outside diameter a solid threaded bearing is attached to the upper surface of the damper at opposite sides of the peripheral edge, each of the solid threaded bearings includes a threaded element, the threaded elements of the solid threaded bearings extend beyond the peripheral edge of the damper, one of the threaded elements passed through the first aperture and the other threaded element passed through the second aperture, a gasketed washer engaged around the threaded element bearing against the inner surface adjacent the second aperture.

* * * * *